(12) United States Patent
Lu et al.

(10) Patent No.: US 8,909,837 B2
(45) Date of Patent: Dec. 9, 2014

(54) METHOD FOR EXECUTING SYSTEM MANAGEMENT INTERRUPT BY USING IDENTIFIERS

(75) Inventors: Ying-Chih Lu, Taipei (TW); Yu-Hui Wang, Taipei (TW)

(73) Assignee: Inventec Corporation, Taipei (TW)

( * ) Notice: Subject to any disclaimer, the term of this patent is extended or adjusted under 35 U.S.C. 154(b) by 1015 days.

(21) Appl. No.: 12/982,824

(22) Filed: Dec. 30, 2010

(65) Prior Publication Data

US 2012/0124265 A1 May 17, 2012

(30) Foreign Application Priority Data

Nov. 12, 2010 (TW) .............................. 99139035 A

(51) Int. Cl.
*G06F 13/24* (2006.01)
*G06F 9/44* (2006.01)

(52) U.S. Cl.
CPC .............. *G06F 9/4423* (2013.01); *G06F 13/24* (2013.01); *G06F 9/4401* (2013.01)
USPC ....................................................... 710/268

(58) Field of Classification Search
USPC ................................. 710/260–269
See application file for complete search history.

(56) References Cited

U.S. PATENT DOCUMENTS

| | | | | |
|---|---|---|---|---|
| 6,834,352 B2 * | 12/2004 | Shin | .............................. | 713/300 |
| 6,907,521 B2 * | 6/2005 | Saw-Chu et al. | .................. | 713/1 |
| 7,200,701 B2 * | 4/2007 | Stultz | ............................ | 710/267 |
| 7,337,254 B2 * | 2/2008 | Choi et al. | .................... | 710/266 |
| 7,363,411 B2 * | 4/2008 | Kobayashi et al. | ........... | 710/261 |
| 7,454,547 B1 * | 11/2008 | Nallagatla et al. | ............. | 710/260 |
| 7,500,040 B2 * | 3/2009 | Gupta et al. | ................. | 710/302 |
| 7,577,831 B2 * | 8/2009 | Pant et al. | ........................ | 713/1 |
| 2007/0150632 A1 * | 6/2007 | Ayyar et al. | ................... | 710/260 |

* cited by examiner

*Primary Examiner* — Raymond Phan
(74) *Attorney, Agent, or Firm* — CKC & Partners Co., Ltd.

(57) ABSTRACT

A method for executing a system management interrupt (SMI) is provided. When a power on self test (POST) is executed, a first identifier is generated and stored into a system management mode block of a memory. During a process for starting an operating system (OS), the first identifier is read from the system management mode block as a second identifier, and the second identifier is stored into an OS block of the memory. When the OS wants to use a system management interrupt, the first identifier and the second identifier are respectively read from the system management mode block and the OS block. Afterwards, it is determined whether the first identifier and the second identifier are the same. If the first identifier and the second identifier are the same, the SMI is executed.

10 Claims, 2 Drawing Sheets

METHOD FOR EXECUTING SYSTEM MANAGEMENT INTERRUPT BY USING IDENTIFIERS

CROSS-REFERENCE TO RELATED APPLICATION

This application claims the priority benefit of Taiwan application serial no. 99139035, filed on Nov. 12, 2010. The entirety of the above-mentioned patent application is hereby incorporated by reference herein and made a part of this specification.

BACKGROUND

1. Field of the Invention

The invention relates to a method for executing a system management interrupt. Particularly, the invention relates to a method for protecting a system management interrupt.

2. Description of Related Art

A system management mode (SMM) is a special function of a central processing unit (CPU) of a general computer system. When a system management interrupt (SMI) is triggered to the CPU, the SMM is entered. In the SMM, the CPU executes a SMI handler routine of a basic input output system (BIOS), so as to serve the SMI through the SMI handler routine. Moreover, the SMI handler routine is stored in a system management random access memory (SMRAM).

In recent years, the BIOS mainly uses software SMIs (SW SMIs) to execute some important programs without participation of an operating system (OS), for example, updating the BIOS, enabling or disabling an advanced configuration and power interface (ACPI), inputting an error correction code (ECC), etc. If the SW SMI is improperly used, stability of the system is spoiled, or even the BIOS is damaged which may cause a failure booting.

Since an input output (JO) port of the SW SMI is easy to be obtained, malicious software may use the SW SMI to spoil the system. For example, an IO port address of the SW SMI is generally stored in a fixed ACPI description table (FACP), so that the malicious software can obtain the IO port address of the SW SMI from the FACP. Alternatively, the malicious software can obtain the IO port address of the SW SMI through a manufacture identifier of a south bridge chip.

SUMMARY OF THE INVENTION

The invention is directed to a method for executing a system management interrupt, so as to avoid malicious software directly using the system management interrupt.

The invention provides a method for executing a system management interrupt. When a power on self test (POST) is executed, a first identifier is generated and stored into a system management mode block of a memory, where the system management mode block is hidden under execution of an operating system (OS). During a process for starting the operating system, the first identifier is read from the system management mode block as a second identifier, and the second identifier is stored into an operating system block of the memory. When the operating system wants to use a system management interrupt, the first identifier and the second identifier are respectively read from the system management mode block and the operating system block. Afterwards, it is determined whether the first identifier and the second identifier are the same. When the first identifier and the second identifier are the same, the system management interrupt is executed.

In an embodiment of the invention, after the step of generating the first identifier, the first identifier is ciphered into a first ciphered identifier. Moreover, after the step of reading the first identifier as the second identifier, the second identifier is ciphered into a second ciphered identifier. When the operating system wants to use the system management interrupt, the second ciphered identifier is read from the operating system block and is deciphered. Moreover, a system management mode is entered, and the first ciphered identifier is read from the system management mode block and is deciphered.

In an embodiment of the invention, when the operating system wants to use the system management interrupt, a memory address of the second identifier is written into a register. When a central processing unit (CPU) receives the system management interrupt, a system management mode is entered, and a value of the register is written into the system management mode block. Then, an interrupt handler routine is executed, and the memory address of the second identifier is read from the system management mode block through the interrupt handler routine. Moreover, the second identifier is obtained according to the memory address.

In an embodiment of the invention, the first identifier is a globally unique identifier (GUID).

In an embodiment of the invention, an identifier reading method is established, and the first identifier is read from the system management mode block through the identifier reading method. Moreover, an identifier transmitting method is established, and the first identifier is used as the second identifier through the identifier transmitting method, and the second identifier is stored into the operating system block.

In an embodiment of the invention, in the step that the first identifier is read from the system management mode block through the identifier reading method, during the process of starting the operating system, the identifier reading method is called to generate a customized system management interrupt. The customized system management interrupt is used to read the first identifier from the system management mode block.

In an embodiment of the invention, in the step of storing the second identifier to the operating system block, during the process of starting the operating system, the identifier transmitting method is called. Moreover, the identifier transmitting method is used to transmit the first identifier to the operating system block to serve as the second identifier.

According to the above descriptions, in the invention, identifiers are respectively stored in the operating system block and the system management mode block. When the system management interrupt is about to be used, it is compared whether the two identifiers are the same, and the system management interrupt is executed only when the two identifiers are the same. In this way, a situation that the malicious software easily uses the system management interrupt can be avoided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
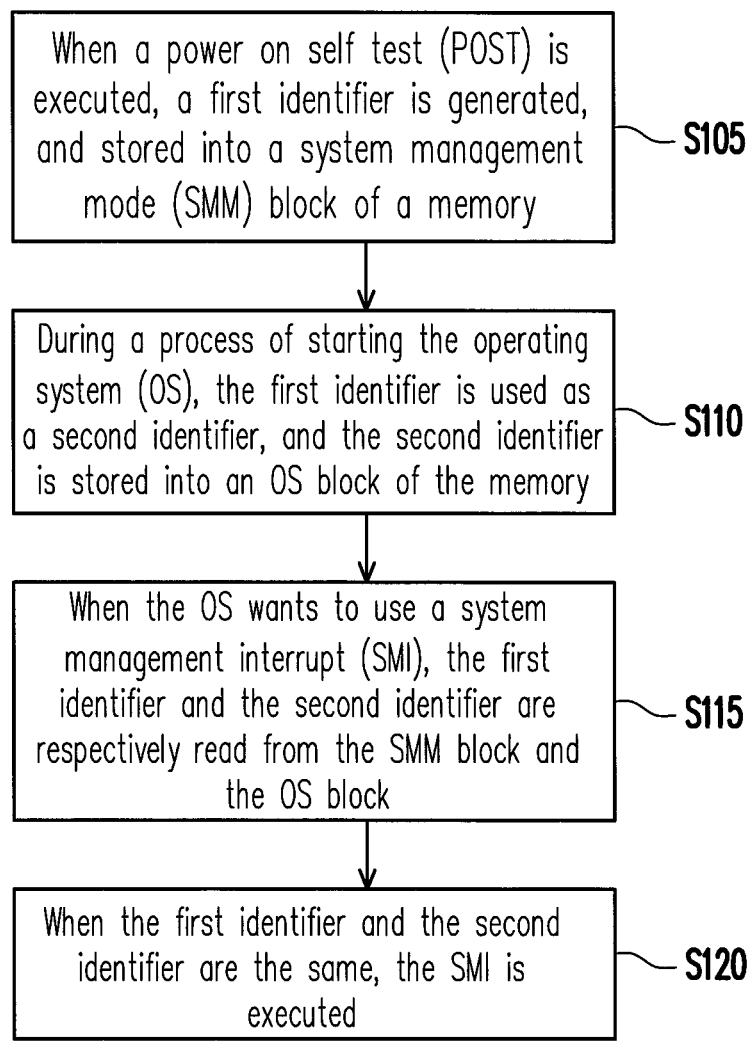
FIG. 1 is a flowchart illustrating a method for executing a system management interrupt according to a first embodiment of the invention.

FIG. 1 is a flowchart illustrating a method for executing a system management interrupt according to a first embodiment of the invention. In the embodiment, the method is suitable for in an electronic apparatus. Referring to FIG. 1, in step S105, when a power on self test (POST) is executed, a first identifier is generated, and the first identifier is stored into a system management mode (SMM) block of a memory. In the present embodiment, the memory includes an operating system (OS) block (a block used by an operating system (OS)), the SMM block and blocks used by other programs. The SMM block is hidden under execution of the OS. For example, the SMM block is, for example, a system management random access memory (SMRAM), and the SMRAM is visible only when a system management mode (SMM) is entered, i.e. when the SMM is entered, the SMRAM is mapped to a memory address space.

Then, in step S110, during a process of starting the OS, the first identifier is read from the SMM block as a second identifier, and the second identifier is stored into an OS block of the memory. For example, the OS generates a customized system management interrupt (SMI) with an interrupt number of F1h, so as to read the first identifier from the SMM block. Moreover, the first identifier is used as the second identifier and stored into the OS block. In addition, the customized SMI is set to be only executed once for each boot.

Moreover, in order to enhance security, during the POST process, after the first identifier is generated, the first identifier can be ciphered into a first ciphered identifier, and then the first ciphered identifier is stored into the SMM block. During the process of starting the OS, after the customized SMI is used to obtain and decipher the first ciphered identifier, the first identifier is used as the second identifier. Now, the second identifier can also be ciphered into a second ciphered identifier and stored into the OS block.

Then, in step S115, when the OS wants to use the SMI, the first identifier and the second identifier are respectively read from the SMM block and the OS block. When the OS wants to use the SMI, the OS transmits the second identifier to a SMI handler routine, and the SMI handler routine reads the first identifier from the SMM block. Here, if the second ciphered identifier is stored in the OS block, the OS first deciphers the second ciphered identifier and then transmits it to the SMI handler routine.

Finally, in step S120, if the first identifier and the second identifier are the same, the SMI is executed. The SMI handler routine compares the first identifier and the second identifier for determining whether the two identifiers are the same. The SMI required by the OS is executed only when the two identifiers are the same.

In the first embodiment, the first identifier is used as a key for executing the SMI, i.e. identifiers are respectively stored in the SMM block and the OS block, and when the OS wants to use the SMI, it is compared whether the two identifiers are the same, and the SMI is executed only when the two identifiers are the same. Since the second identifier is read and transmitted to the SMI handler routine through the OS, the SMI can be effectively executed only when an application program of the second identifier is obtained. In this way, the malicious software cannot directly use the SMI by skipping the OS.

Second Embodiment

In order to avoid repetition of the identifier generated during each boot, in the present embodiment, a globally unique identifier (GUID) is used as the identifier. Moreover, the SMI mechanism used herein is a software SMI (SW SMI).

Figure 2:
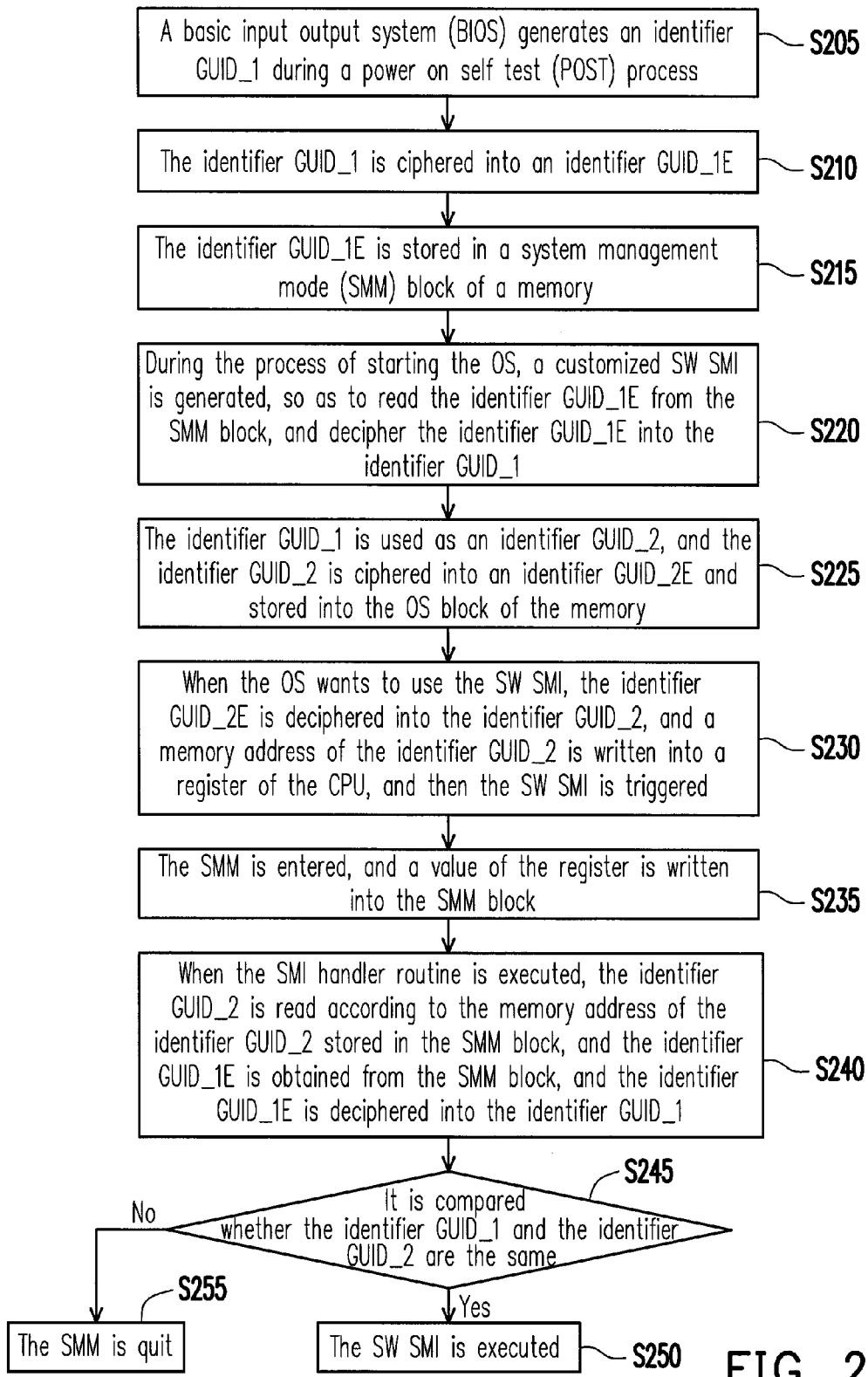
FIG. 2 is a flowchart illustrating a method for executing a system management interrupt according to a second embodiment of the invention.

FIG. 2 is a flowchart illustrating a method for executing a system management interrupt according to a second embodiment of the invention.

Referring to FIG. 2, in step S205, a basic input output system (BIOS) generates an identifier GUID_1 during the POST process. Then, in step S210, the identifier GUID_1 is ciphered into an identifier GUID_1E. Then, in step S215, the identifier GUID_1E is stored into the SMM block (for example, the SMRAM) of the memory.

When the BOIS complete executing the POST, the OS is started. During the process of starting the OS (starting of the OS is still not completed), in step S220, a customized SW SMI is generated, so as to read the identifier GUID_1E from the SMM block, and decipher the identifier GUID_1 E into the identifier GUID_1.

For example, an identifier reading method is established, for example, a method_INI of an ACPI machine language (AML) program is established, so as to read the identifier GUID_1 from the SMM block through the identifier reading method. During the process of staring the OS, the identifier reading method is called, and if it is the first time for calling the identifier reading method, a customized SW SMI (for example, with an interrupt number of F1h) is generated, and the customized SW SMI is used to read the identifier GUID_1 from the SMM block. Here, the customized SW SMI is only executed once, so as to avoid being used by the malicious software.

Then, in step S225, the identifier GUID_1 is used as an identifier GUID_2, and the identifier GUID_2 is ciphered into an identifier GUID_2E and stored into the OS block. In detail, an identifier transmitting method can be established, for example, a method_SWSK of the AML program is established, so as to use the identifier GUID_1 as the identifier GUID_2 through the identifier transmitting method. Namely, during the process of starting the OS, the identifier transmitting method is called, and the identifier transmitting method is used to transmit the identifier GUID_1 to the OS block to serve as the identifier GUID_2, and cipher the identifier GUID_2 into an identifier GUID_2E. Now, after the identifier GUID_2E is stored into the OS block, the identifier GUID_2 can be removed.

After starting of the OS is completed, when the OS wants to use the SW SMI, in step S230, the OS obtains the identifier GUID_2E and deciphers it into the identifier GUID_2, and writes a memory address of the identifier GUID_2 into a register (for example, EAX) of the CPU, and then triggers the SW SMI, for example, by using a SMI command port B2h.

When the CPU receives the SW SMI, in step S235, the SMM is entered, and a value of the register (for example, a CPU context including the EAX) is written into the SMM block. Namely, the memory address of the identifier GUID_2 is written into the SMM block since after the SMM is entered, the CPU may store a current state into the SMM block (for example, the SMRAM).

Then, in step S240, when the SMI handler routine is executed, the identifier GUID_2 is read according to the memory address of the identifier GUID_2 stored in the SMM block. Moreover, the identifier GUID_1E is obtained from the SMM block, and the identifier GUID_1E is deciphered into the identifier GUID_1.

Then, in step S245, the SMI handler routine compares whether the identifier GUID_1 and the identifier GUID_2 are the same. If the two identifiers are the same, in step S250, the SW SMI is executed. If the two identifiers are different, in step S255, the SMM is quit. In this way, the SMI is protected from being used by the malicious software.

In summary, in the invention, identifiers are respectively stored in the OS block and the SMM block. When the SMI is about to be used, it is compared whether the two identifiers are the same, and the SMI is executed only when the two identifiers are the same. In this way, the SMIs used under the OS are all protected, and the application programs can only send the SMIs through the OS. Therefore, a situation that the malicious software directly uses the SMI can be avoided. Moreover, an identifier is dynamically generated during each boot, so as to reduce a chance of being cracked by the malicious software.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for executing a system management interrupt, suitable for an electronic apparatus, comprising:
when a power on self test (POST) is executed, generating a first identifier and storing the first identifier into a system management mode block of a memory, wherein the system management mode block is hidden under execution of an operating system;
during a process of starting the operating system, reading the first identifier from the system management mode block as a second identifier, and storing the second identifier into an operating system block of the memory;
after the step of generating the first identifier, ciphering the first identifier into a first ciphered identifier;
after the step of reading the first identifier as the second identifier ciphering the second identifier into a second ciphered identifier;
when the operating system wants to use a system management interrupt, respectively reading the first identifier and the second identifier from the system management mode block and the operating system block;
determining whether the first identifier and the second identifier are the same; and
executing the system management interrupt when the first identifier and the second identifier are the same.

2. The method for executing the system management interrupt as claimed in claim 1, further comprising:
establishing an identifier reading method, and reading the first identifier from the system management mode block through the identifier reading method; and
establishing an identifier transmitting method, and using the first identifier as the second identifier through the identifier transmitting method, and storing the second identifier into the operating system block.

3. The method for executing the system management interrupt as claimed in claim 1, wherein when the operating system wants to use the system management interrupt, the step of respectively reading the first identifier and the second identifier from the system management mode block and the operating system block comprises:

reading the second ciphered identifier from the operating system block, and deciphering it into the second identifier;
entering a system management mode, and reading the first ciphered identifier from the system management mode block and deciphering it into the first identifier.

4. The method for executing the system management interrupt as claimed in claim 1, further comprising:
when the operating system wants to use the system management interrupt, writing a memory address of the second identifier into a register.

5. The method for executing the system management interrupt as claimed in claim 1, wherein the first identifier comprises a globally unique identifier (GUID).

6. The method for executing the system management interrupt as claimed in claim 1, further comprising:
establishing an identifier reading method, and reading the first identifier from the system management mode block through the identifier reading method; and
establishing an identifier transmitting method, and using the first identifier as the second identifier through the identifier transmitting method, and storing the second identifier into the operating system block.

7. The method for executing the system management interrupt as claimed in claim 4, wherein after the step of writing the memory address of the second identifier into the register, the method further comprises:
when a central processing unit (CPU) receives the system management interrupt, entering a system management mode, and writing a value of the register into the system management mode block;
executing an interrupt handler routine, and reading the memory address of the second identifier from the system management mode block through the interrupt handler routine; and
obtaining the second identifier according to the memory address.

8. The method for executing the system management interrupt as claimed in claim 6, wherein the step of reading the first identifier from the system management mode block through the identifier reading method comprises:
during a process of starting the operating system, calling the identifier reading method to generate a customized system management interrupt; and
using the customized system management interrupt to read the first identifier from the system management mode block.

9. The method for executing the system management interrupt as claimed in claim 6, wherein the step of storing the second identifier to the operating system block comprises:
during a process of starting the operating system, calling the identifier transmitting method; and
using the identifier transmitting method to transmit the first identifier to the operating system block to serve as the second identifier.

10. A method for executing a system management interrupt, suitable for an electronic apparatus, comprising:
when a power on self test (POST) is executed, generating a first identifier and ciphering the first identifier into a first ciphered identifier;
storing the first ciphered identifier into a system management mode block of a memory, wherein the system management mode block is hidden under execution of an operating system;
during a process of starting the operating system, calling an identifier reading method to generate a customized system management interrupt, and using the customized system management interrupt to read the first ciphered identifier from the system management mode block, and deciphering it into the first identifier;

calling and identifier transmitting method to transmit the first identifier to the operating system block to serve as the second identifier, and ciphering it into a second ciphered identifier;

when the operating system wants to use a system management interrupt, reading the second ciphered identifier from the operating system block, and deciphering it into the second identifier, and writing a memory address of the second identifier into a register;

when a central processing unit (CPU) receives the system management interrupt, entering a system management mode, and writing a value of the register into the system management mode block;

executing an interrupt handler routine, and obtaining the second identifier according to the memory address of the second identifier from the system management mode block through the interrupt handler routine; and reading the first ciphered identifier from the system management mode block under the system management mode, and deciphering it into the first identifier;

determining whether the first identifier and the second identifier are the same;

executing the system management interrupt if the first identifier and the second identifier are the same; and quitting the system management interrupt if the first identifier and the second identifier are different.

* * * * *